US012780625B2

(12) United States Patent
Zammuto et al.

(10) Patent No.: US 12,780,625 B2
(45) Date of Patent: Nov. 3, 2026

(54) SYSTEM FOR CONTROLLED DESCENT OF A LIFT

(71) Applicant: Thomson Industries, Inc., Marengo, IL (US)

(72) Inventors: Jared Ret Zammuto, Caledonia, IL (US); Karl Martin Peter Paulsson, Trollgatan (SE)

(73) Assignee: Thomson Industries, Inc., Marengo, IL (US)

( * ) Notice: Subject to any disclaimer, the term of this patent is extended or adjusted under 35 U.S.C. 154(b) by 323 days.

(21) Appl. No.: 18/624,190

(22) Filed: Apr. 2, 2024

(65) Prior Publication Data

US 2025/0304413 A1 Oct. 2, 2025

(51) Int. Cl.

| | |
|---|---|
| ***B66F 7/28*** | (2006.01) |
| ***B66F 7/06*** | (2006.01) |
| ***F16D 55/04*** | (2006.01) |

(52) U.S. Cl.

CPC .............. *B66F 7/28* (2013.01); *B66F 7/0608* (2013.01); *B66F 7/0666* (2013.01); *F16D 55/04* (2013.01)

(58) Field of Classification Search

None

See application file for complete search history.

(56) References Cited

U.S. PATENT DOCUMENTS

| | | | | |
|---|---|---|---|---|
| 4,364,453 A * | 12/1982 | Serina | B66B 5/027 | 187/289 |
| 5,346,045 A * | 9/1994 | Bennett | G09B 9/12 | 74/89.37 |
| 5,680,911 A * | 10/1997 | Wang | B66D 5/24 | 187/350 |

(Continued)

FOREIGN PATENT DOCUMENTS

| | | |
|---|---|---|
| AT | 171028 B | 4/1952 |
| CN | 201777826 U | 3/2011 |

(Continued)

OTHER PUBLICATIONS

International Search Rreport issued in corresponding International (PCT) App. No. PCT/US2025/016272 (Jun. 6, 2025).

(Continued)

*Primary Examiner* — Daniel P Cahn
*Assistant Examiner* — Benjamin Alexander Pezzlo
(74) *Attorney, Agent, or Firm* — Armstrong Teasdale LLP

(57) ABSTRACT

A system for controlling descent of a lift includes a linear actuator driven by an electric motor to raise and lower the lift. The motor has a shaft that rotates about an axis. A holding brake applies a braking torque to the shaft when the motor is not driving the shaft. A variable torque control device includes a rotatable member rotatable about the axis and a stationary member radially outward of the rotatable member. A clutch includes a first member that rotates with, but moves axially relative to, the motor shaft and a second member axially spaced from the first member when the (Continued)

clutch is disengaged and coupled to the first member when the clutch is engaged. The second member supports the rotatable member of the torque control device. The system further includes means for engaging the clutch and releasing the holding brake.

20 Claims, 6 Drawing Sheets

(56) References Cited

U.S. PATENT DOCUMENTS

| | | | | | |
|---|---|---|---|---|---|
| 5,890,565 | A * | 4/1999 | Wang | B66D 5/24 187/350 |
| 6,817,453 | B2 * | 11/2004 | Koeppe, Jr. | B66B 5/027 188/173 |
| 7,051,842 | B2 * | 5/2006 | Chen | B66B 5/027 187/314 |
| 11,787,679 | B2 * | 10/2023 | Bafile | B66F 17/006 182/19 |
| 2002/0125076 | A1 * | 9/2002 | Wang | B66B 5/027 187/314 |
| 2020/0284329 | A1 * | 9/2020 | Soltermann | B66F 7/0608 |

FOREIGN PATENT DOCUMENTS

| | | | | | |
|---|---|---|---|---|---|
| CN | 109399510 | A | | 3/2019 | |
| CN | 208948760 | U | | 6/2019 | |
| DE | 20112146 | U1 | * | 11/2002 | B66B 5/027 |
| DE | 102008026247 | B4 | | 8/2018 | |
| DE | 102017107519 | A1 | * | 10/2018 | H02K 7/10 |
| DE | 102019105560 | A1 | * | 9/2020 | F16D 65/22 |
| EP | 2762434 | A1 | * | 8/2014 | B66B 5/044 |
| EP | 4492648 | A1 | * | 1/2025 | F16D 67/06 |
| FR | 3000774 | A1 | * | 7/2014 | F16D 67/06 |
| FR | 3155042 | A1 | * | 5/2025 | B66F 11/042 |
| JP | 2006057688 | A | * | 3/2006 | |
| RU | 2774480 | C1 | | 6/2022 | |
| WO | WO-2025099528 | A1 | * | 5/2025 | B66F 11/042 |

OTHER PUBLICATIONS

Written Opinion issued in corresponding International (PCT) App. No. PCT/US2025/016272 (Jun. 6, 2025).
English (machine) translation of CN 109399510 A.
English (machine) translation of CN 201777826 U.
English (machine) translation of CN 208948760 U.
English (machine) translation of RU 2774480 Ca.

* cited by examiner

SYSTEM FOR CONTROLLED DESCENT OF A LIFT

BACKGROUND OF THE INVENTION a. Field of the Invention

This disclosure relates to a system for raising and lowering lifts. In particular, the disclosure relates to a system that enables controlled descent of a lift.

b. Background Art

Lifts, such as a scissor lift, frequently employ linear actuators to raise and lower the lift and generally control the vertical position of a platform or similar structure on the lift. Many conventional lifts include hydraulic linear actuators. The rate of fluid flow in the hydraulic linear actuator is often limited by a metering orifice thereby limiting the speed at which the lift may be raised and lowered. Modern lifts, however, increasingly employ electric linear actuators driven by an electric motor and therefore cannot rely on the metering orifice found in hydraulic linear actuators to limit the speed at which the lift is raised and lowered.

The ability to control the speed at which the lift is raised and lowered is often critical for the safety of individuals who may be supported on, or located in the vicinity of, the lift and to prevent damage to the lift, its components and objects supported on the lift and other objects in the vicinity of the lift. In lifts employing electric linear actuators, for example, when the lift is in a raised position and the electric motor stops driving the linear actuator (e.g., due to a loss of power to the electric motor, a failure of the electric motor or related electronic component, or the actions of an operator of the lift), the weight of the platform and loads supported on the platform imposes a force on the linear actuator that may cause retraction of the linear actuator and back-driving of the electric motor. Unless this force is opposed, it can lead to a rapid, uncontrolled descent of the lift.

To address the risks referenced above, many conventional systems employing electric linear actuators for raising and lowering lifts employ a holding brake that is mechanically set (e.g., spring set) and applies a braking torque to the output shaft of the electric motor when the motor stops driving the actuator. The use of a holding brake reduces the risk of an uncontrolled descent of the lift, but restricts the ability to lower the lift for removal of individuals or objects supported on the lift. For this reason, the holding brake typically includes a manual release mechanism that allows the brake to be released for further descent of the lift. Doing so, however, again creates the risk of a rapid, uncontrolled descent of the lift and the associated risks described above that the holding brake was intended to address.

The inventors herein have recognized a need for a system for controlling descent of a lift that will minimize and/or eliminate one or more of the above-identified deficiencies.

BRIEF SUMMARY OF THE INVENTION

This disclosure relates to a system for raising and lowering lifts. In particular, the disclosure relates to a system that enables controlled descent of a lift.

A system for controlling descent of a lift in accordance with one embodiment includes a linear actuator including an extension tube movable between a plurality of linear positions to raise and lower the lift. The system further includes an electric motor configured to cause movement of the extension tube of the linear actuator. The electric motor has a motor shaft coupled to the extension tube and configured for rotation about a rotational axis. The system further includes a holding brake configured to apply a braking torque to the motor shaft to prevent rotation of the motor shaft about the rotational axis and maintain a linear position of the extension tube of the linear actuator. The holding brake includes a first friction disc coupled to the motor shaft for rotation therewith and a second friction disc fixed against rotation. The system further includes a variable torque control device having a rotatable member configured for rotation about the rotational axis and a stationary member disposed radially outward of the rotatable member. Interaction between the rotatable member and the stationary member limits a rotational speed of the rotatable member about the rotational axis. The system further includes a clutch movable between an engaged state and a disengaged state. The clutch includes a first member configured for rotation with the motor shaft about the rotational axis and axial movement relative to the motor shaft along the rotational axis and a second member axially spaced from the first member when the clutch is in the disengaged state and coupled to the first member when the clutch is in the engaged state. The second member is configured to support the rotatable member of the variable torque control device. The system further includes a clutch engagement and holding brake release mechanism including a first lever coupled to the first member of the clutch, a second lever coupled to the second friction disc of the holding brake, and a lever actuator connecting the first and second levers and configured, upon movement of the lever actuator, to cause movement of the first lever to move the first member of the clutch towards the second member of the clutch and movement of the second lever to move the second friction disc of the holding brake away from the first friction disc of the holding brake.

A system for controlling descent of a lift following in accordance with another embodiment includes a linear actuator including an extension tube movable between a plurality of linear positions to raise and lower the lift. The system further includes an electric motor configured to cause movement of the extension tube of the linear actuator. The electric motor has a motor shaft coupled to the extension tube and configured for rotation about a rotational axis. The system further includes a holding brake configured to apply a braking torque to the motor shaft to prevent rotation of the motor shaft about the rotational axis and maintain a linear position of the extension tube of the linear actuator. The holding brake includes a first friction disc coupled to the motor shaft for rotation therewith and a second friction disc fixed against rotation. The system further includes a variable torque control device having a rotatable member configured for rotation about the rotational axis and a stationary member disposed radially outward of the rotatable member. Interaction between the rotatable member and the stationary member limits a rotational speed of the rotatable member about the rotational axis. The system further includes a clutch movable between an engaged state and a disengaged state. The clutch includes a first member configured for rotation with the motor shaft about the rotational axis and axial movement relative to the motor shaft along the rotational axis and a second member axially spaced from the first member when the clutch is in the disengaged state and coupled to the first member when the clutch is in the engaged state. The second member is configured to support the rotatable member of the variable torque control device.

The system further includes means for engaging the clutch and releasing the holding brake.

A system for controlling descent of a lift in accordance with the present teachings is advantageous relative to conventional systems. The system enables an operator to engage a clutch coupling a variable torque control device to the motor shaft while releasing the holding brake on the motor shaft to allow the lift to be lowered while also limiting the speed at which the lift is lowered to prevent a rapid, uncontrolled descent of the lift. Further, the system allows the operator to both engage the clutch coupling the variable torque control device to the motor shaft and release the holding brake in a relatively simple and synchronized manner.

The foregoing and other aspects, features, details, utilities, and advantages of the present teachings will be apparent from reading the following description and claims, and from reviewing the accompanying drawings.

DETAILED DESCRIPTION OF EMBODIMENTS OF THE INVENTION

Figure 1:
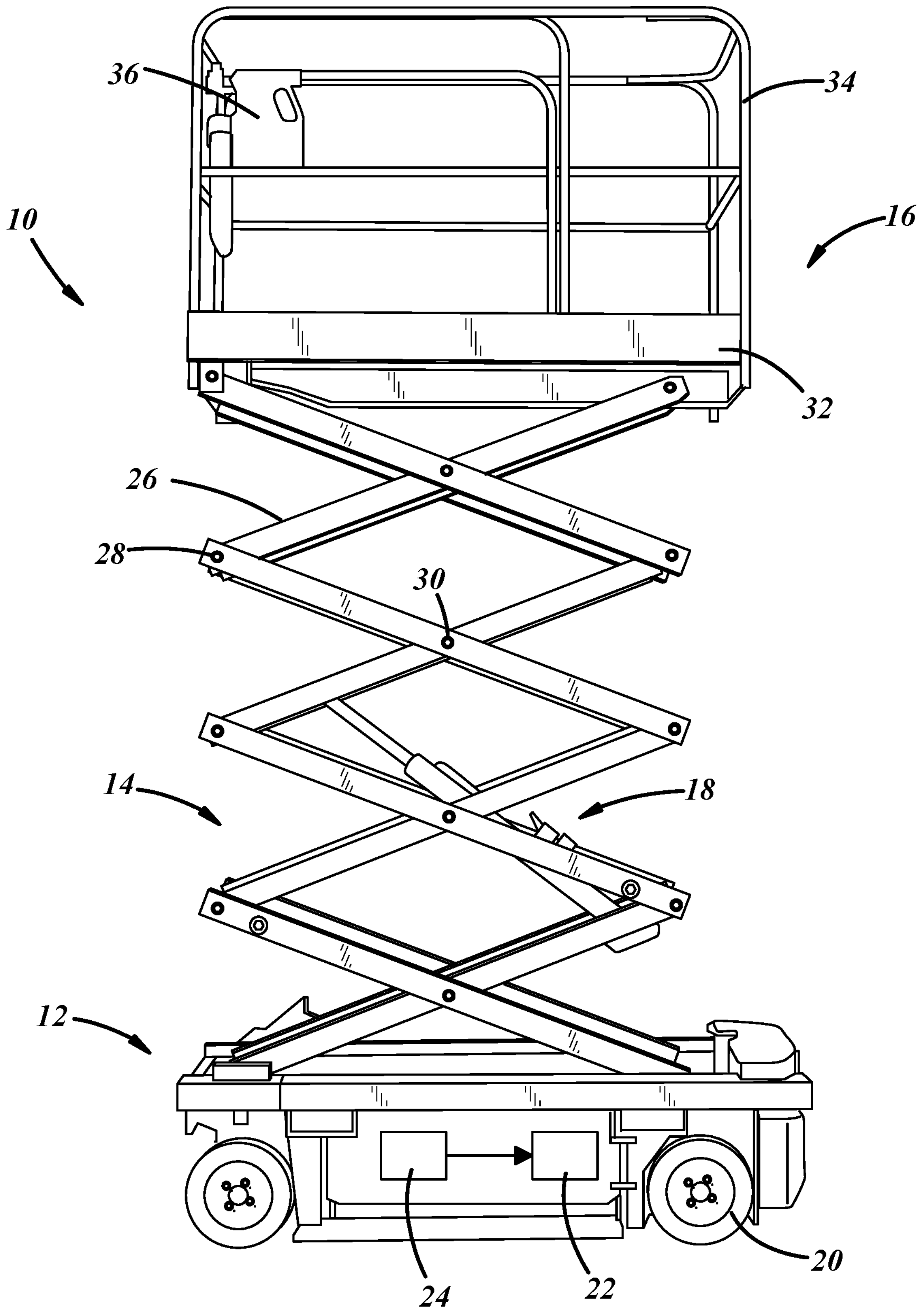
FIG. 1 is a side view of a lift incorporating a system for raising and lowering the lift.

Referring now to the drawings wherein like reference numerals are used to identify identical components in the various views, FIG. 1 illustrates a lift 10 and, in particular, a scissor lift. Lift 10 is provided to deliver persons and/or objects to different vertical positions to allow various tasks to be performed such as construction and maintenance of buildings, power transmission conduits and telecommunication lines, storage and movement of goods (e.g., in warehouses or retail stores), harvesting of foods and urban forestry management. Although lift 10 comprises a scissor lift in the illustrated embodiment, it should be understood that the systems disclosed herein may find use in other types of lifts including, but not limited to, boom lifts (both articulating and telescoping) and forklifts. Lift 10 may include a base 12, a scissor mechanism 14, a platform 16 and a system 18 for raising and lowering lift 10. In accordance with the teachings herein, system 18 is further configured to provide for the controlled descent of lift 10 from a raised position.

Base 12 supports the other components of lift 10 and provides a mechanism for moving lift 10 between different locations. Base 12 may be supported on a plurality of wheels 20 and may include an electric motor 22 or similar power unit for driving one or more of the wheels 20 to move lift 10 between locations. Base 12 may further include a power source 24 such as a battery or other electric storage device for providing electric power to motor 22, system 18 and other components (not shown) of lift 10 such as controllers for system 18 and/or motor 22, operator interfaces, etc.

Scissor mechanism 14 is provided to raise and lower platform 16 relative to base 12. Again, although lift 10 includes a scissor mechanism 14 in the illustrated embodiment, it should be understood that other lifts may include, for example, articulating or telescoping booms to raise and lower components of the lift. Scissor mechanism 14 is coupled at a first, lower end to base 12 and at a second, upper end to platform 16 and may assume a plurality of positions between a fully retracted position in which the distance between platform 16 and base 12 is minimized and a fully extended position in which the distance between platform 16 and base 12 is maximized. As used herein “retracted position” and “extended position” (when not modified by “fully”) are relative terms such that scissor mechanism 14 moves from an extended position to a retracted position when being lowered or retracted and moves from a retracted position to an extended position when being raised or extended. Scissor mechanism 14 includes a plurality of links 26 with each link 26 pivotally coupled at each end to either base 12, platform 16 or another link 26 at end pivot points 28 and coupled approximately midway between the ends to another link 26 at a center pivot point 30. As scissor mechanism 14 is extended by system 18, the articulation angle of each end pivot point 28 increases while the articulation angle at the center pivot point 30 decreases. As scissor mechanism 14 is retracted by system 18, the articulation angle at each end pivot point 28 decreases while the articulation angle at the center pivot point 30 increases.

Platform 16 supports individuals and objects being moved between different vertical positions. Platform 16 is connected to one end of scissor mechanism 14 and may include a floor 32 and one or more side walls or guard rails 34 to prevent falls from platform 16. Platform 16 may also include an operator interface 36 connected to one or both of system 18 and motor 22 through which an individual on platform 16 can control system 18 to raise and lower lift 10 and motor 22 to change the location of lift 10.

Figure 2:
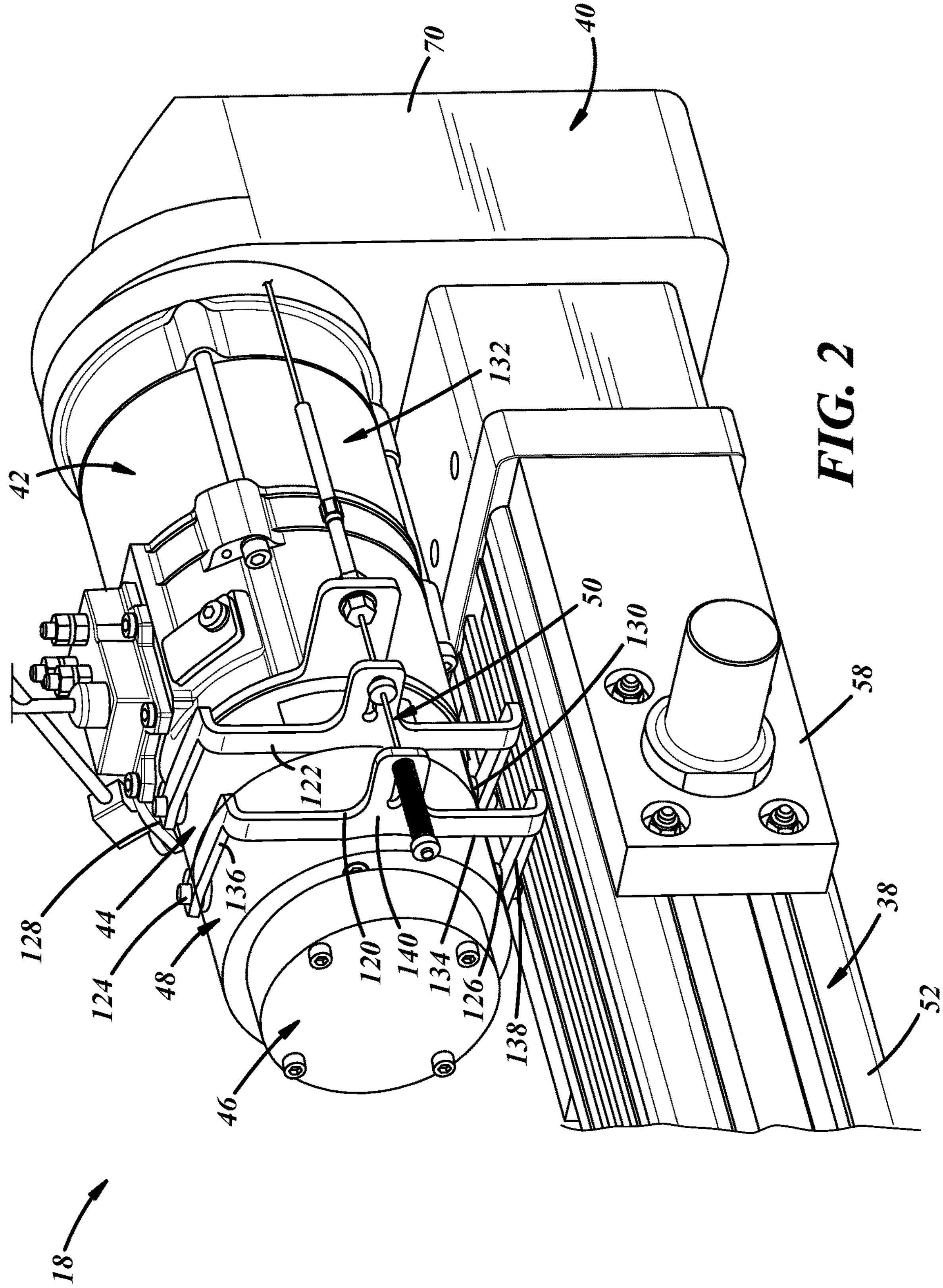
FIG. 2 is a perspective view of one embodiment of a system for controlling descent of a lift.
Figure 3:
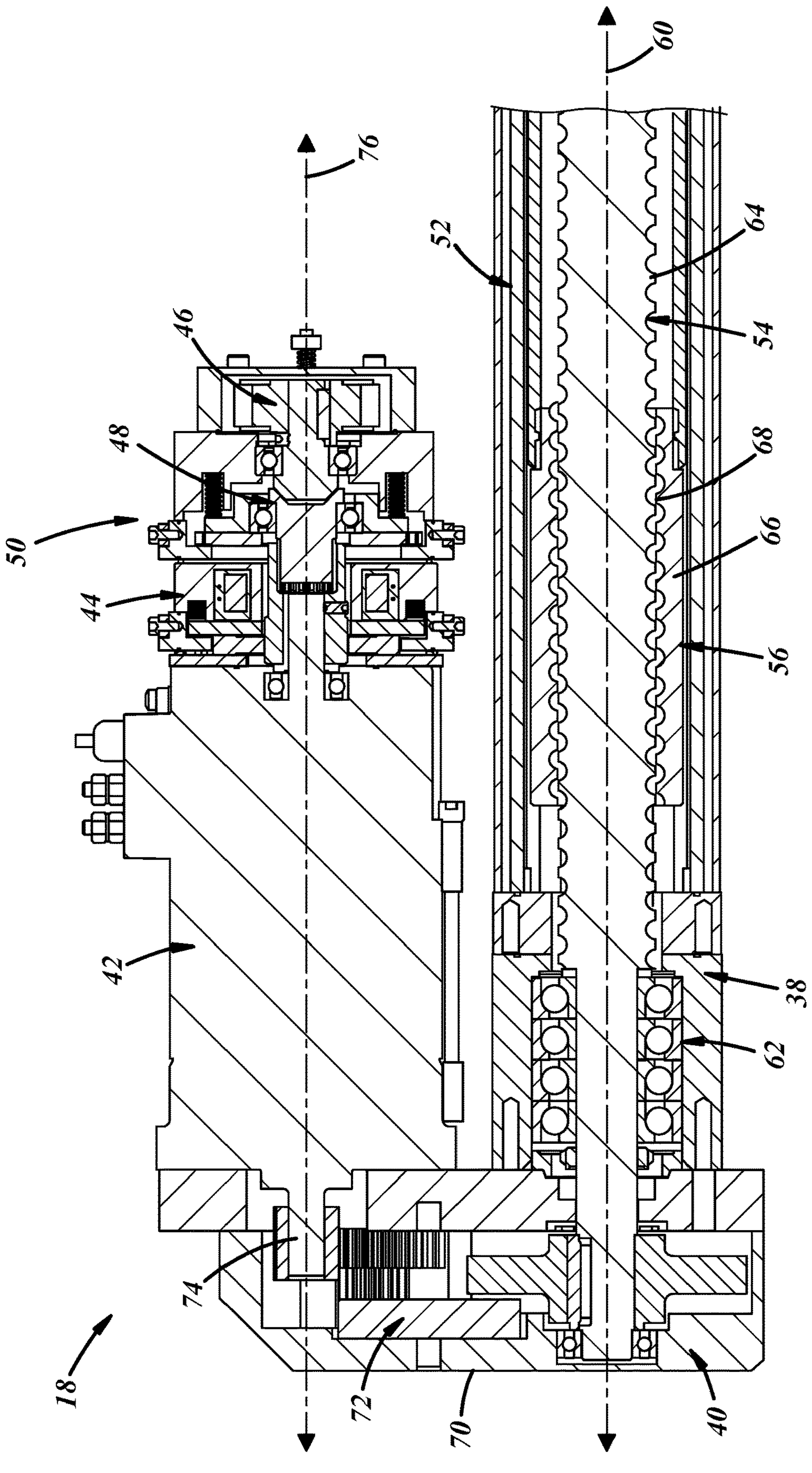
FIG. 3 is a partial cross-sectional view of the system of FIG. 2.

System 18 is provided to extend and retract scissor mechanism 14 to raise and lower lift 10. In accordance with the teachings disclosed herein, system 18 also enables a controlled descent of lift 10 during, for example, a loss of power, failure of a component of system 18, or an operator command to lower lift 10. Referring now to FIGS. 2-3, system 18 includes a linear actuator 38, a gearbox 40, and electric motor 42, a holding brake 44, a variable torque control device 46, a clutch 48 and means, such as clutch engagement and holding brake release mechanism 50, for engaging clutch 48 and releasing holding brake 44.

Linear actuator 38 applies a force to a link 26 of scissor mechanism 14 to extend or retract scissor mechanism 14. Referring to FIG. 3, actuator 36 may include a housing 52, a screw shaft 54, and an extension tube 56 extension tube movable between a plurality of linear positions to raise and lower the lift 10.

Housing 52 is provided to position and orient the other components of linear actuator 38 and to prevent those components from exposure to external elements and objects. Housing 52 may be made from conventional materials including metals and plastics. Housing 52 is tubular in shape and defines an opening at one longitudinal end through which screw shaft 54 extends for connection to gearbox 40 and an opening at the opposite longitudinal end through which extension tube 56 moves inward and outward as it is retracted and extended, respectively. Conventional fluid and debris seals may be disposed within the openings between housing 52 and the screw shaft 54 and extension tube 56. Referring to FIG. 2, housing 52 may further define one or more connectors 58 for connection with links 26 of scissor mechanism 14 to mount and position linear actuator 38.

Referring again to FIG. 3, screw shaft 54 drives extension tube 56 to extend extension tube 56 outward from housing 52 and retract extension tube 56 into housing 52. Screw shaft 54 is disposed within housing 52, but one longitudinal end of screw shaft 54 projects outwardly from housing 52 for connection with gearbox 40. Screw shaft 54 is disposed about, and may be centered about, an axis 60. Screw shaft 54 is configured for rotation relative to housing 52 about axis 60 and may be supported for rotation relative to housing 52 by one or more bearings 62. A portion of screw shaft 54 defines a thread 64 or ball track on a radially outer surface opposing a corresponding thread or ball track formed in extension tube 56.

Extension tube 56 transmits forces from linear actuator 18 to scissor mechanism 14 to extend or retract scissor mechanism 14 and raise or lower lift 10. Extension tube 56 is disposed within housing 52, but one longitudinal end of extension tube 56 projects outwardly from housing 52 for connection with a link 26 of scissor mechanism 14. Extension tube 56 may be disposed about, and centered about, axis 60 and is configured for translational movement relative to housing 52 along axis 60. Extension tube 56 is tubular in shape and is configured to receive screw shaft 54 therein. A ball nut 66 within extension tube 56 defines a thread 68 or ball track on a radially inner surface opposing the thread 64 or ball track formed on the radially outer surface of screw shaft 54. Through threads 64, 68, rotational movement of screw shaft 54 about axis 60 is translated into linear movement of extension tube 56 along axis 60.

Gearbox 40 transmits torque from motor 42 to screw shaft 54 of linear actuator 38 to extend or retract extension tube 56 of linear actuator 38 while also allowing for variation in the rotational speed of motor 42 and screw shaft 54. When motor 42 stops driving gearbox 40 and linear actuator 38 (e.g., due to a loss of power, a failure of motor 42 or related electronic component, or an operator command), the weight of scissor mechanism 14, platform 16 and any loads on platform 16 will exert a force on extension tube 56 and, as a result, screw shaft 54 and gearbox 40 will likewise transmit torque from screw shaft 54 to motor 42. Gear box 40 includes a housing 70 that may be rigidly coupled to motor 42 and housing 52 of linear actuator 38 and a plurality of gears 72 arranged within housing 70 to transfer torque between motor 42 and screw shaft 54. It should be understood that the number, size and arrangement of gears 72 may vary depending on the application.

Electric motor 42 generates forces to cause movement (extend or retract) of extension tube 56 of linear actuator 38. Motor 42 may comprise a conventional alternating current (AC) or direct current (DC) motor and may draw power from power source 24 on base 12 of lift 10 or another power source. Motor 42 includes a motor shaft 74 that is configured for rotation about a rotational axis 76. Motor shaft 74 projects outwardly from each end of motor 42. One longitudinal end of motor shaft 74 extends into and is coupled to one of the gears 72 in gearbox 40 and is coupled to extension tube 56 of linear actuator 38 through gearbox 40 and screw shaft 54. The opposite longitudinal end of motor shaft 74 extends into, and supports members of, holding brake 44 as described in greater detail below.

Figure 5:
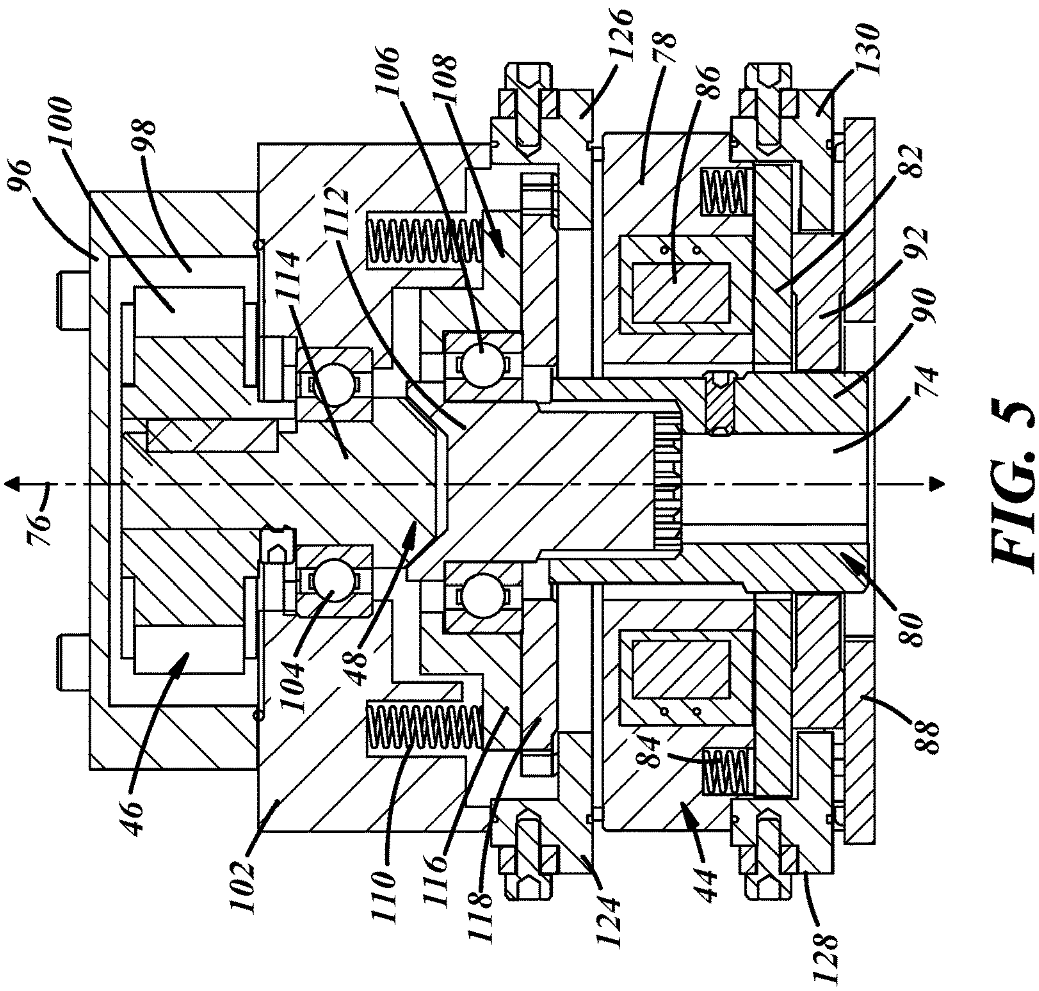
FIG. 5 is a cross-sectional view of a portion of FIG. 4.
Figure 7:
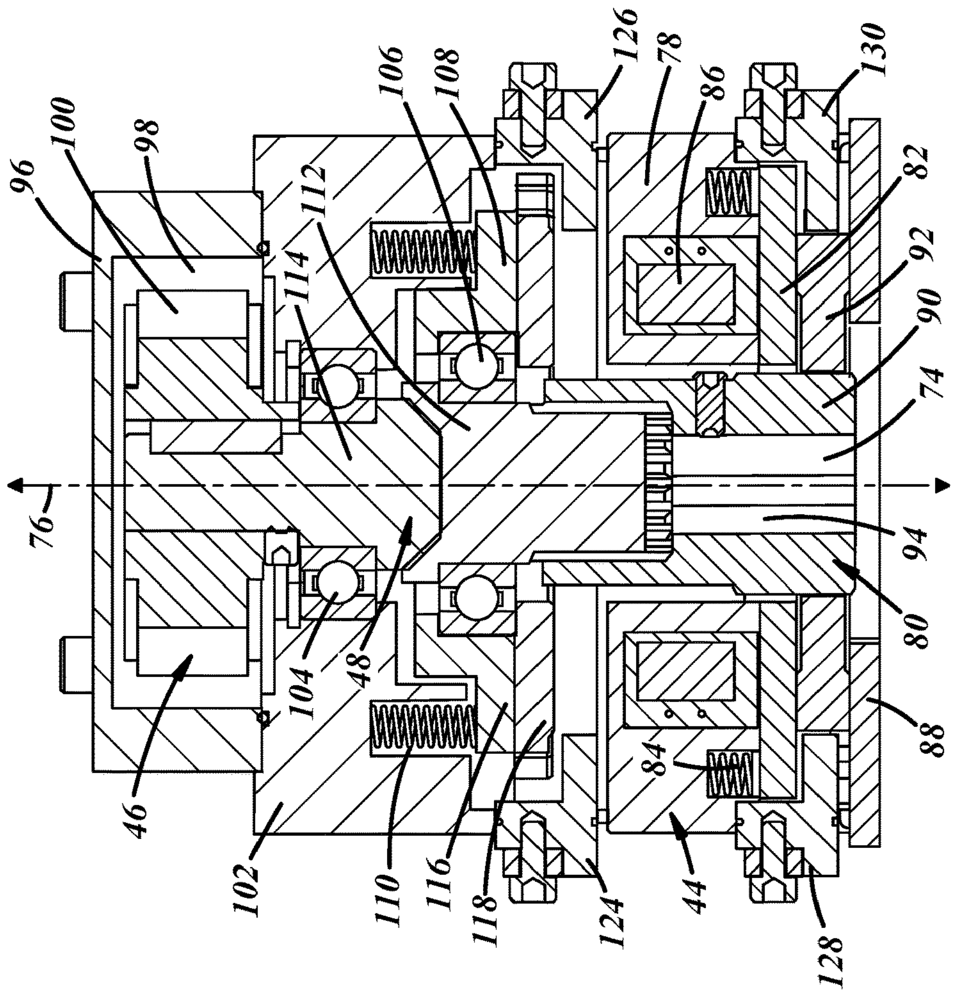
FIG. 7 is a cross-sectional view of a portion of FIG. 6.
Figure 6:
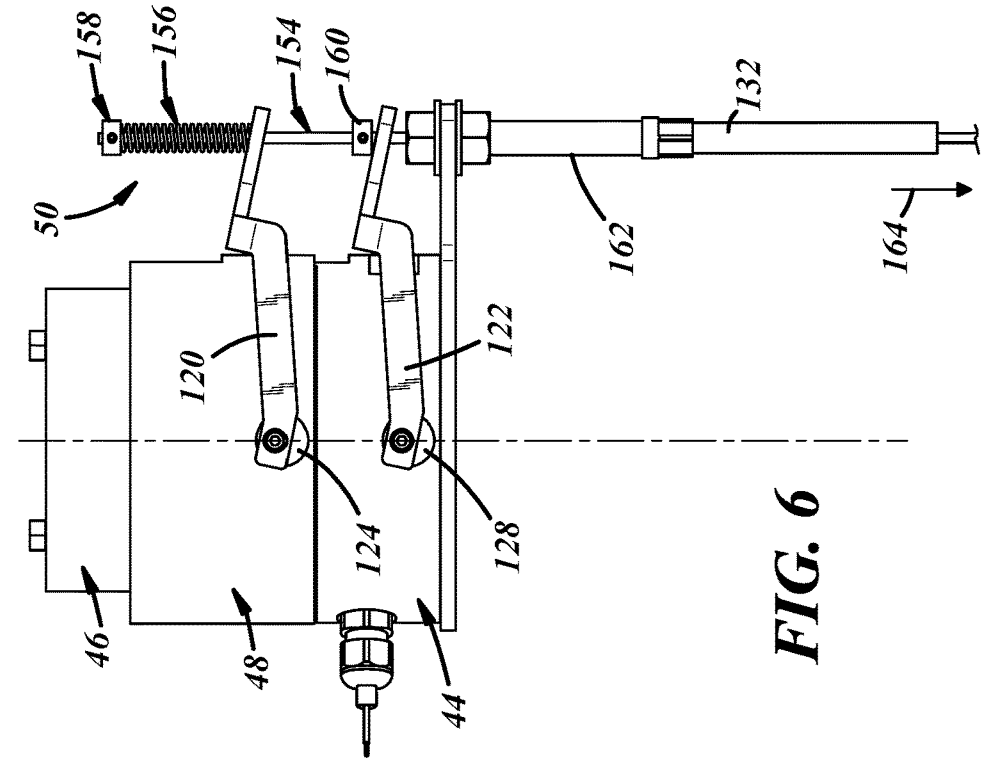
FIG. 6 is a side view of a portion of the system of FIGS. 2-3 illustrating a clutch engagement and holding brake release mechanism of the system in an actuated state.

Holding brake 44 is configured to apply a braking torque to motor shaft 74 when motor 42 stops driving motor shaft 74 (e.g., due to a loss of power, a failure of motor 42 or related electronic component, or an operator command). In this manner, holding brake 44 prevents rotation of motor shaft 74 and, as a result, changes in the linear position of extension tube 56 of linear actuator 38 and the vertical position of lift 10 that might otherwise result from external forces—including those exerted by the weight of scissor mechanism 14, platform 16 and the loads carried by platform 16 that may otherwise cause back-driving of motor 42 through extension tube 56 and screw shaft 54 of linear actuator 38 and gears 72 of gearbox 40. Referring now to FIGS. 5 and 7, holding brake 44 may comprise a spring-set, electromagnetically-released brake and may include a housing 78, a rotor 80, an armature 82, springs 84 and an electromagnet 86.

Housing 78 is provided to position and orient the other components of holding brake 44 and to protect those components from foreign objects and elements. Housing 78 may be made from conventional metals and metal alloys. Housing 78 is disposed about, and may be centered about, axis 76. Housing 78 may define closed bores proximate one axial end of housing 78 configured to receive springs 84 and electromagnet 86. Housing 78 defines an end plate 88 at an opposite axial end for a purpose described hereinbelow. In accordance with one aspect of the system disclosed herein, housing 78 further defines diametrically opposed openings intermediate the axial ends of housing 78 and configured to receive members of clutch engagement and holding brake release mechanism 50 for a purpose described hereinbelow.

Rotor 80 is provided to transmit torque from motor shaft 74 to a member of clutch 48 and is also used to transmit a braking torque to motor shaft 74. Rotor 80 includes a hub 90 and a friction disc 92 supported on hub 90. Hub 90 is disposed about, and may be centered about, axis 76 and is configured for rotation with motor shaft 74 about axis 76. Hub 90 is tubular in shape with an inner diameter that varies along the axial length of hub 90. One axial end of hub 90 is configured to receive one end of motor shaft 74. Hub 90 may be coupled to motor shaft 74 for rotation therewith in a conventional manner including, for example, through a key 94 extending form one of motor shaft 74 or hub 90 into a keyway formed in the other of motor shaft 74 or hub 90. The other axial end of hub 90 is configured to receive a member of clutch 48. Hub 90 may define a plurality of axially extending splines or teeth on a radially inner surface configured to engage corresponding splines or teeth on a radially outer surface of the member of clutch 48 to thereby couple hub 90 and the member of clutch 48 for rotation about axis 76 while permitting axial movement of the member of clutch 48 relative to hub 90 along axis 76. Hub 90 may further define a plurality of axially extending splines or teeth on a radially outer surface configured to engage corresponding splines or teeth on a radially inner surface of friction disc 92 to thereby couple friction disc 92 to hub 90 for rotation with hub 90 and motor shaft 74 about axis 76 while permitting axial movement of friction disc 92 relative to hub 90 along axis 76.

Armature 82 is provided for selective engagement with friction disc 92 to apply a braking torque to friction disc 92, hub 90 and motor shaft 74. Armature 82 therefore functions as another friction disc within holding brake 44. Armature 82 is disposed about, and may be centered about axis 76. Armature 82 is fixed against rotational movement about axis 76, but is movable in either direction along axis 76 in response to forces generated by springs 84 and electromagnet 86.

Springs 84 bias armature 82 in one direction along axis 76 towards, and into engagement with, friction disc 92 to urge friction disc 92 against end plate 88 and thereby apply holding brake 44 to prevent further rotation of friction disc 92, hub 90 and motor shaft 74. Springs 84 are disposed within closed bores formed within housing 78 and seated between housing 78 and armature 82.

Electromagnet 86 urges armature 82 in another direction along axis 76 away from friction disc 92. When electromagnet 86 is energized, an electromagnetic circuit is established between housing 78, armature 82 and electromagnet 86 that draws armature 82 towards electromagnet 86 and away from friction disc 92 against the force of springs 84 to thereby release holding brake 44 and allow rotation of friction disc 92, hub 90 and motor shaft 74. Motor 42 and electromagnet 86 of holding brake 44 may receive power from a common power source such as power source 24. In this manner, whenever power is supplied to motor 42, power will also be supplied to electromagnet 86 of holding brake 44 and holding brake 44 will remain in a released state. Whenever power is not supplied to motor 42 (e.g., due to a loss of power from power source 24), power is also not supplied to electromagnet 86 of holding brake 44 and holding brake 44 will transition to an applied state to prevent rotation of friction disc 92, hub 90 and motor shaft 74. In accordance with one aspect of the system 18 disclosed herein, holding brake 44 may also be manually released when in the applied state using clutch engagement and holding brake release mechanism 50 as discussed in greater detail below.

Variable torque control device 46 is provided to limit the speed of descent of lift 10 and, in particular, the speed of descent of platform 16 and loads supported by platform 16 when (i) motor 42 is no longer driving linear actuator 38 (e.g., due to a loss of power, a failure of motor 42 or related electronic component, or an operator command) (ii) holding brake 44 is released and (iii) scissor mechanism 14 is moving from an extended position to a retracted position. In one embodiment, device 46 comprises a centrifugal brake. In another embodiment, device 46 comprises an eddy current brake. Device 46 includes a housing 96, and stationary and rotatable members 98, 100 disposed within housing 96.

Housing 96 is provided to position and orient the other components of device 46 and to prevent exposure of those components to external elements and objects. Housing 96 may be made from conventional materials including metals and plastics. Housing 96 is disposed about, and may be centered about, axis 76 and is configured for coupling to clutch 48 at one axial end. Housing 96 is open at the axial end facing clutch 48 and closed at an opposite axial end. Housing 96 defines an interior space configured to receive stationary member 98 and rotatable member 100.

Stationary member 98 interacts with rotatable member 100 to produce a braking torque to limit a rotational speed of a member of clutch 48 about axis 76. Stationary member 98 may be disposed about, and centered about, axis 76 and may be fixed within housing 96 against rotation about axis 76. Stationary member 98 is disposed radially outward of rotatable member 100. In the embodiment in which variable torque control device 46 comprises a centrifugal brake, stationary member 98 may comprise a radially inner surface of housing 96 which acts as a brake drum configured for frictional engagement with rotatable member 100 or one of more friction pads mounted on the radially inner surface of housing 96 through, for example adhesives and configured for frictional engagement with rotatable member 100. In the embodiment in which variable torque control device 46 comprises an eddy current brake, stationary member 98 may comprise a permanent magnet or electromagnet mounted to housing 96 and configured to generate a magnet field.

Rotatable member 100 is also supported within housing 96, radially inwardly of stationary member 98. Rotatable member 100 may also be disposed about, and centered about axis 76 and is configured for rotation about axis 76. Rotatable member 100 is supported on a member of clutch 48 as described in greater detail below. In the embodiment in which variable torque control device 46 comprises a centrifugal brake, rotatable member 100 may include one or more brake shoes mounted on the member of clutch 48 including friction pads and corresponding springs extending from the member of clutch 48 to each friction pad and biasing the friction pad(s) radially inwardly. When rotatable member 100 rotates about axis 76, centrifugal force acting on rotatable member 100 urges the friction pads radially outward from axis 76 against the biasing force of the springs. When the speed of rotation of rotatable member 100 about axis 76 reaches a certain speed, and the centrifugal force acting on rotatable member 100 reaches a certain level, rotatable member 100 will contact stationary member 98 generating a braking torque on rotatable member 100 and, through clutch 48 as discussed hereinbelow, motor shaft 74 thereby inhibiting rotation of motor shaft 74 and limiting the speed at which lift 10 descends under the weight of scissor mechanism 14, platform 16 and loads supported by platform 16. In the embodiment in which variable torque control device 46 comprises an eddy current brake, rotatable member 100 may include a conductive body coupled to the member of clutch 48. Eddy currents induced in the conductive body upon rotation of the conductive body through the magnetic or electromagnetic field generated by the stationary member 98 establish a braking torque on rotatable member 100 and, through clutch 48 as discussed hereinbelow, motor shaft 74 thereby inhibiting rotation of motor shaft 74 and limiting the speed at which lift 10 descends under the weight of scissor mechanism 14, platform 16 and loads supported by platform 16. The speed at which rotatable member 100 engages stationary member 98 (and, therefore, the maximum speed at which lift 10 may descend) is variable and may be established through selection of the spring force generated by the springs in the case of a centrifugal brake or the through selection of the magnet or current supplied to the electromagnet in the case of an eddy current brake.

Clutch 48 is provided to selectively couple motor shaft 74 and rotatable member 100 of variable torque control device 46 for rotation about axis 76. In the absence of clutch 48, a direct coupling between motor shaft 74 and rotatable member 100 of variable torque control device 46 would require configuring device 46 in such a way that device 46 would only engage at relatively high rotational speeds to avoid creating a drag on motor shaft 74 during normal operating conditions for motor 42. By only selectively coupling motor shaft 74 and rotatable member 100 of variable torque control device 46 using clutch 48, variable torque control device 46 can be configured to allow engagement of device 46 and application of a braking torque to motor shaft 74 even when motor shaft 74 is rotating at a relatively low rotational speeds. Clutch 48 is movable between a disengaged state in which motor shaft 74 and rotatable member 100 are uncoupled and an engaged state in which motor shaft 74 and rotatable member 100 are rotatably coupled. In the illustrated embodiment, clutch 48 comprises a cone clutch.

Clutch 48 may comprise a cone clutch. Clutch 48 may include a housing 102, bearings 104, 106, a force transmitting plate assembly 108, springs 110, and members 112, 114.

Housing 102 is provided to position and orient the other components of clutch 48 and to prevent those components from exposure to external elements and objects. Housing 102 may be made from conventional materials including metals and plastics. Housing 102 is disposed between, and may be coupled to, housing 78 of holding brake 44 and housing 96 of variable torque control device 46. Housing 102 is open at either axial end facing holding brake 44 and variable torque control device 46. In accordance with one aspect of the system disclosed herein, housing 102 defines diametrically opposed openings intermediate the axial ends of housing 102 and configured to receive members of clutch engagement and holding brake release mechanism 50 for a purpose described hereinbelow.

Bearing 104 comprise a radial bearing configured to facilitate rotation of member 114 of clutch 48 about axis 76 and relative to housing 102. Bearing 106 comprises a thrust bearing configured to absorb loads along axis 76 as force transmitting plate assembly 108 and member 112 of clutch 48 are moved along axis 76 and to transmit forces applied from force transmitting plate assembly 108 to member 112.

Force transmitting plate assembly 108 provides a means for transmitting forces to member 112, through bearing 106, to move member 112 along axis 76. Assembly 108 includes members 116, 118 that define opposed shoulders for the outer race of bearing 106 along a radially inner surface of assembly 108. Member 116 defines a spring seat for springs 110 on one axial side of assembly 108. Member 118 defines a surface for engagement by clutch engagement and holding brake release mechanism 50 on an opposite axial side of assembly 108 as discussed in greater detail hereinbelow.

Springs 110 urge assembly 108, and therefore, member 112 in one direction along axis 76 away from member 114 to disengage clutch 48. Springs 110 may be disposed within closed bores formed in housing 102 and are seated between housing 102 and member 116 of force transmitting plate assembly 108.

Member 112 selectively transmits torque from motor shaft 74 to member 114. Member 112 is disposed about, and may be centered about, axis 76. One axial end of member 112 is configured to be received within hub 90 of rotor 80 of holding brake 44 in a manner that couples member 112 to hub 90 for rotation together with motor shaft 74 about axis 76, but permits axial movement of member 112 relative to hub 90 and motor shaft 74 along axis 76. Member 112 may therefore, for example, define a plurality of axially extending splines or teeth on a radially outer surface configured to engagement corresponding splines or teeth on a radially inner surface of hub 90. The opposite axial end of member 112 is configured for selective engagement with member 114 of clutch 48 as member 112 is moved along axis 76. Member 112 defines a conical recess configured to receive one axial end of member 114 as member 112 is moved along axis 76 and clutch 48 moves from a disengaged state to an engaged state. Member 112 may define a plurality of tapered teeth on a radially inner surface of member 112 configured to engage corresponding teeth on a radially outer surface of member 114.

Member 114 transmits torque from member 112 (and indirectly form motor shaft 74) to rotatable member 100 of variable torque control device 46 when clutch 48 is engaged. Member 114 is disposed about, and may be centered about, axis 76. Member 114 is supported for rotation about axis 76 within housing 102 of clutch 48 by bearing 104. One axial end of member 114 extends into housing 96 of variable torque control device 48 and is configured to support rotatable member 100 of device 48 for rotation with member 114. In embodiments in which device 48 comprises a centrifugal brake and the rotatable member 100 of device 48 comprises one or more brake shoes, member 114 may, for example, providing a mounting surface for one end of a spring of each brake shoe. In embodiments in which device 48 comprises an eddy current brake and the rotatable member of device 48 comprises a conductive body, member 114 may provide a mounting surface for the conductive body. The opposite axial end of member 114 has a conical shape and is configured to be received within the conical recess of member 112. Member 114 is axially spaced from member 112 when clutch 48 is in a disengaged state. When clutch 48 transitions from the disengaged state to an engaged state and member 112 is moved along axis 76 towards member 114, member 114 is received within and coupled to member 112 for rotation therewith. Member 114 may define a plurality of tapered teeth on a radially outer surface of member 114 configured to engage corresponding teeth on a radially inner surface of member 112.

Clutch engagement and holding brake release mechanism 50 provides a means for engaging clutch 48 and releasing holding brake 44. In particular, clutch engagement and holding brake release mechanism 50 is provided to move clutch 48 from a disengaged state to an engaged state and contemporaneously move holding brake 44 from an applied state to a released state to enable a controlled descent of lift 10. Releasing holding brake 44 allows for the weight of scissor mechanism, platform 16 and loads on platform 16 to back drive motor shaft 74 of motor 42 (through extension tube 56 and screw shaft 54 of linear actuator 38 and gears 72 of gear box 40) thereby causing extension tube 56 to move from an extended position to a retracted position and lift 10 to descend from an extended position to a retracted position. Engaging clutch 48, however, limits the speed of descent and prevents an uncontrolled descent of lift 10 by coupling motor shaft 74 with the rotatable member 100 of variable torque control device 46 and causing application of variable torque control device 46 if the speed of descent exceeds a predetermined speed. In this manner, an operator can implement a controlled descent of lift 10. Referring to FIGS. 2 and 4-7, mechanism 50 includes levers 120, 122, cam assemblies 124, 126, 128, 130 and a lever actuator 132.

Figure 8:
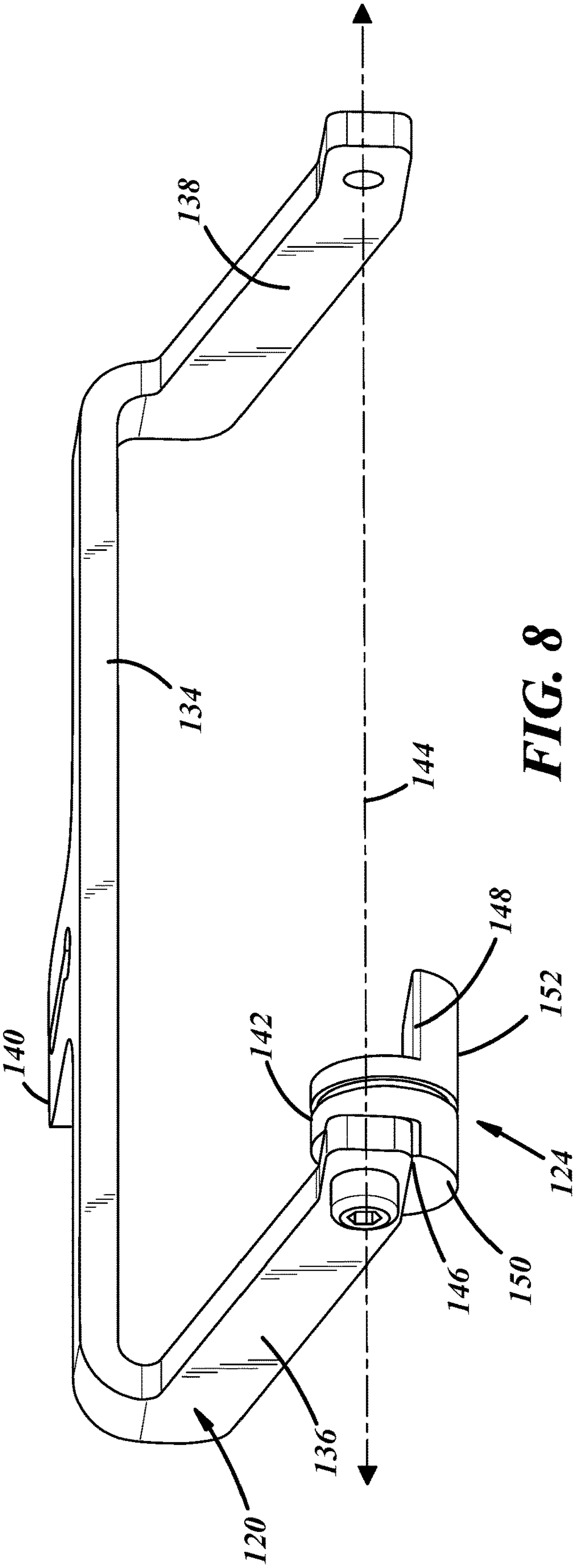
FIG. 8 is a perspective view of one component of the clutch engagement and holding brake release mechanism of the system shown in FIGS. 2 and 4-7.

Levers 120, 122 actuate cam assemblies 124, 126, 128, 130 responsive to movement of lever actuator 132 to cause clutch 48 to transition from a disengaged state to an engaged state and to cause holding brake 44 to transition from an applied state to a released state. Lever 120 is coupled to member 112 of clutch 48 (through cam assemblies 124, 126, force transmitting plate assembly 108 and bearing 106) while lever 122 is coupled to armature 82 of holding brake 44 (through cam assemblies 128, 130). Each lever 120, 122 may be a unitary (one-piece) structure or may include multiple members coupled together. Levers 120, 122 may be identical or substantially identical in shape. Therefore, it should be understood that the following description of lever 120 also applies to lever 122. Referring to FIGS. 2 and 8, lever 120 includes a body 134 that extends across the diameter of clutch 48 (holding brake 44 in the case of lever 122) in a direction generally parallel to a plane containing axes 60, 76. Arms 136, 138 extend from either longitudinal end of body 134 in a direction towards the plane while arm 140 extends from a portion of body 134 intermediate the longitudinal ends of body 130 (e.g., a longitudinal center of body 134) away from the plane. Arms 136, 138 engage elements of cam assemblies 124, 126 (cam assemblies 128, 130 in the case of lever 122). Arm 140 defines an aperture configured to receive a member of lever actuator 132 extending therethrough. In the absence of movement of lever actuator 132, levers 120, 122 maintain a default position illustrated in FIG. 4 in which clutch 48 is disengaged (with member 112 of clutch 48 axially spaced from member 114 of clutch 48) and holding brake 44 (assuming no power is being provided to the electromagnet of holding brake 44) is applied (with armature 82 urging friction disc 92 into engagement with brake plate 88).

Referring to FIGS. 4-7, cam assemblies 124, 126 and 128, 130 translate movement of levers 120, 122, respectively, resulting from movement of lever actuator 132 into movement of member 112 of clutch 48 (through force transmitting plate assembly 108 and bearing 106) and armature 82 of holding brake 44. Movement of levers 120, 122 in a first direction causes movement of member 112 of clutch 48 and armature 82 of holding brake 44, respectively, in one direction along axis 76 towards member 114 of clutch 48 (in the case of member 112 of clutch 48) and away from friction disc 92 (in the case of armature 82 of holding brake 44). Movement of levers 120, 122 in the opposite direction causes movement of member 112 of clutch 48 and armature 82 of holding brake 44 in the opposite direction along axis 76 away from member 114 of clutch 48 and towards friction disc 92, respectively.

Referring to FIG. 8, cam assembly 124 will be described in greater detail. It should be understood that a similar cam assembly 126 will be coupled to the end of arm 138 of lever 120 and that the description of cam assembly 124 generally applies to each of cam assemblies 126, 128, 130. Cam assembly 124 includes a generally circular body 142 that is configured for rotation about an axis 144 (extending perpendicular to the plane containing axes 60, 76 in FIG. 2) as lever 120 is moved back and forth. At each axial end of body 142, an arcuate portion of body 142 is absent such that body 142 defines a flat 146, 148 at each axial end. Flat 146 is configured to receive one end of arm 136 of lever 120. Flat 148 is configured to receive member 118 of force transmitting plate assembly 108 of clutch 48. It should be understood that corresponding flats on cam assembly 126 will receive one end of arm 138 of lever 120 and member 118 of force transmitting plate assembly 108 of clutch 48 and that corresponding flats on cam assemblies 128, 130 will receive one end of a corresponding arm of lever 122 and armature 82 of holding brake 44. Body 142 further defines cam surfaces 150, 152 opposite flats 146, 148. Surfaces 150, 152 oppose and contact surfaces of housing 102 of clutch 48. It should be understood that corresponding surfaces on cam assembly 126 will also oppose and contact surfaces of housing 102 of clutch 48 while corresponding surfaces on cam assemblies 128, 130 will oppose and contact surfaces of housing 78 of holding brake 44. Movement of lever 120 causes rotation of body 142 of cam assembly 124 through the interface of arm 136 and flat 146 as surfaces 150, 152 bear against the surface of housing 102 of clutch 48. As body 142 rotates, rotation of flat 148 will displace the circumferential edges where flat 148 and cam surface 152 meet causing one edge to move in the direction towards member 118 of force transmitting plate assembly 108 of clutch 48 and, as a result, urging member 118 of force transmitting plate assembly 108 of clutch 48 and, ultimately, member 112 of clutch 48 in one direction along axis 76 towards member 114 of clutch 48 to engage clutch 48. Likewise, movement of lever 122 and cam assemblies 128, 130 will result in movement of armature 82 of holding brake 44 in the same direction along axis 76 and away from friction disc 92 to release holding brake 44.

Referring again to FIGS. 4 and 6, lever actuator 132 is provided to actuate levers 120, 122 to cause clutch 48 to transition from a disengaged state to an engaged state and to cause holding brake 44 to transition from an applied state to a released state. Lever actuator 132 connects levers 120, 122 and is configured to cause movement of lever 120 to move member 112 of clutch 48 towards member 114 of clutch 48 and movement of lever 122 to move armature 82 of holding brake 44 away from friction disc 92. Lever actuator 132 includes a shaft 154, a spring 156, rings 158, 160 and a cover 162.

Shaft 154 provides a means for delivering a force used in causing movement of levers 120, 122. In one embodiment, shaft 154 may comprise a relatively thin, flexible wire made from spring steel. Shaft 154 extends through aligned apertures in arms 140 in levers 120, 122 and may also extend through an aligned aperture in an arm extending from end plate 88 of holding brake 44. A force may be applied to shaft 154 either manually or through an automated system to pull shaft 154 in a direction 164 parallel to axis 76 (downward in FIGS. 4 and 6, rightward in FIG. 2) and away from a default position of shaft 154 shown in FIG. 4. The force of this movement is then transmitted to levers 120, 122 by spring 156 and rings 158, 160 as described hereinbelow.

Spring 156 is a compression spring that transmits the force applied to shaft 154 to lever 120 and also returns shaft 154 to a default position in the absence of that force. Spring 156 is disposed about shaft 154 between one end of shaft 154 and one side of lever 120. In particular, spring 156 is seated between ring 158 and arm 140 of lever 120.

Rings 158, 160 assist in transmitting forces to levers 120, 122 during movement of shaft 154. Rings 158, 160 are supported on shaft 154 in fixed positions on shaft 154. Although rings 158, 160 are circular in shape in the illustrated embodiment, it should be understood that rings 158, 160 may assume any of a wide variety of shapes. Ring 158 is supported on shaft 154 proximate one end of shaft 154 and provides a spring seat for spring 156. Ring 160 is supported on shaft 154 between levers 120, 122 and has one side configured for engagement with lever 122 when shaft 154 is moved in direction 164 to cause movement of lever 122. In accordance with certain embodiments of the system disclosed herein, ring 160 is spaced from lever 122 when mechanism 50 is in the default position shown in FIG. 4 for a purpose described hereinbelow.

Cover 162 is provided to protect shaft 154 from external objects and elements and for mounting lever actuator 132 to end plate 88 of holding brake 44. Cover 162 is tubular in shape and may be made from conventional materials including plastics. Cover 162 may include a connector at one end configured for securing cover 162 to end plate 88.

Referring again to FIGS. 4 and 6, lever actuator 132 operates in the following manner. When a controlled descent of lift 10 is desired, a force is applied to one end of shaft 154 to move shaft 154 in direction 164. Movement of shaft 154 results in corresponding movement of ring 158 and compression of spring 156. Spring 156 resists compression between lever 120 and ring 158 thereby applying a force to lever 120 and causing movement of lever 120 in one direction. Movement of lever 120 causes corresponding movement of cam assemblies 124, 126, force transmitting plate assembly 108 (against the force of springs 110) and member 112 of clutch 48 towards member 114 to engage clutch 48. Continued movement of shaft 154 in direction 164 causes ring 160 to engage lever 122 thereby applying a force to lever 122 and causing movement of lever 122 in one direction. Movement of lever 122 causes corresponding movement of cam assemblies 128, 130 and armature 82 (against the force or springs 84) away from friction disc 92 to release holding brake 44. As noted above, ring 160 is spaced from lever 122. Therefore, movement of lever 120 begins prior to any movement of lever 122. As a result, clutch 48 is engaged prior to any release of holding brake 44 thereby inhibiting the possibility of a premature release of holding brake 44 and uncontrolled descent of lift 10.

Figure 4:
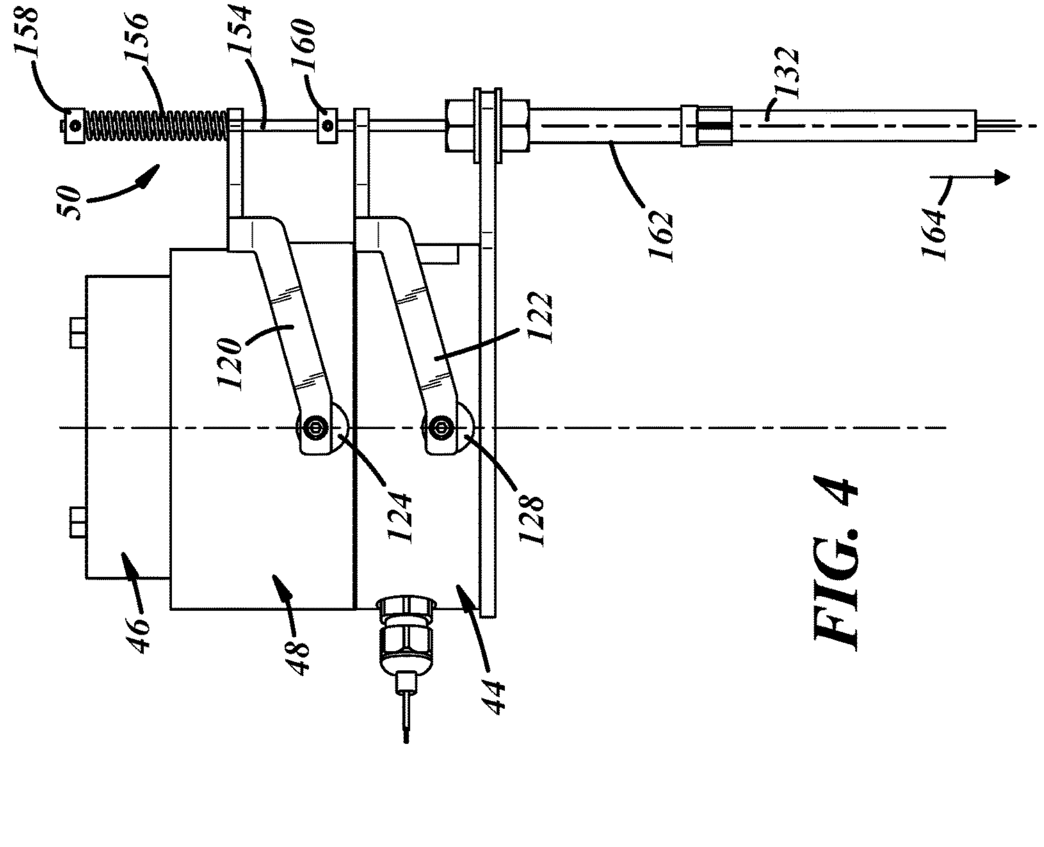
FIG. 4 is a side view of a portion of the system of FIGS. 2-3 illustrating a clutch engagement and holding brake release mechanism of the system in an unactuated state.

When the force applied to shaft 154 is removed, shaft 154, spring 156 and rings 158, 160 return to their default positions shown in FIG. 4. In particular, in the absence of a force applied to shaft 154, springs 84 in holding brake 44 urge armature 82 towards friction disc 92 to apply holding brake 44 and cause corresponding rotation of cam assemblies 128, 130 and movement of lever 122 to its default position. Springs 110 urge force transmitting plate assembly 108 and member 112 of clutch 48 away from member 114 to disengage clutch 48 and cause corresponding rotation of cam assemblies 124, 126 and movement of lever 120 to its default position. Finally, spring 156 urge ring 158 away from lever 120 to return shaft 154 and rings 158, 160 to their default positions.

A system 18 for controlling descent of a lift 10 following a loss of power in accordance with the present teachings is advantageous relative to conventional systems. The system 18 enables an operator to engage a clutch 48 coupling a centrifugal brake 46 to the motor shaft 74 while releasing the holding brake 44 on the motor shaft 74 to allow the lift 10 to be lowered following the loss of power while also limiting the speed at which the lift 10 is lowered to prevent a rapid, uncontrolled descent of the lift. Further, the system 18 allows the operator to both engage the clutch 48 coupling the centrifugal brake 46 to the motor shaft 74 and release the holding brake 44 in a relatively simple and synchronized manner.

While the invention has been shown and described with reference to one or more particular embodiments thereof, it will be understood by those of skill in the art that various changes and modifications can be made without departing from the spirit and scope of the invention.

We claim:

1. A system for controlling descent of a lift, comprising:
- a linear actuator including an extension tube movable between a plurality of linear positions to raise and lower the lift;
- an electric motor configured to cause movement of the extension tube of the linear actuator, the electric motor having a motor shaft coupled to the extension tube and configured for rotation about a rotational axis;
- a holding brake configured to apply a braking torque to the motor shaft to prevent rotation of the motor shaft about the rotational axis and maintain a linear position of the extension tube of the linear actuator, the holding brake including
  - a first friction disc coupled to the motor shaft for rotation therewith; and,
  - a second friction disc fixed against rotation;
- a variable torque control device having
  - a rotatable member configured for rotation about the rotational axis; and,
  - a stationary member disposed radially outward of the rotatable member, interaction between the rotatable member and the stationary member limiting a rotational speed of the rotatable member about the rotational axis;
- a clutch movable between an engaged state and a disengaged state, the clutch having
  - a first member configured for rotation with the motor shaft about the rotational axis and axial movement relative to the motor shaft along the rotational axis; and,
  - a second member axially spaced from the first member when the clutch is in the disengaged state and coupled to the first member when the clutch is in the engaged state, the second member configured to support the rotatable member of the variable torque control device; and,
- a clutch engagement and holding brake release mechanism including
  - a first lever coupled to the first member of the clutch;
  - a second lever coupled to the second friction disc of the holding brake; and,
  - a lever actuator connecting the first and second levers and configured, upon movement of the lever actuator, to cause movement of the first lever to move the first member of the clutch towards the second member of the clutch and movement of the second lever to move the second friction disc of the holding brake away from the first friction disc of the holding brake.

2. The system of claim 1 wherein the lever actuator causes movement of the first lever before movement of the second lever.

3. The system of claim 1 wherein the lever actuator includes:
- a shaft extending through the first and second levers;
- a spring disposed about the shaft between an end of the shaft and a first side of the first lever; and,
- a ring supported on the shaft between the first and second levers and having a first side configured for engagement with a first side of the second lever.

4. The system of claim 3 wherein the first side of the ring is spaced from the first side of the second lever prior to movement of the lever actuator.

5. The system of claim 1 wherein the clutch engagement and holding brake release mechanism further includes a first cam assembly configured to translate movement of the first lever into movement of the first member of the clutch.

6. The system of claim 5 wherein the clutch engagement and holding brake release mechanism further includes a second cam assembly configured to translate movement of the second lever into movement of the second friction disc of the holding brake.

7. The system of claim 1 wherein the holding brake is a spring-set, electromagnetically-released brake and the electric motor and the holding brake receive power from a common power source.

8. The system of claim 1 wherein the variable torque control device comprises a centrifugal brake.

9. The system of claim 1 wherein the clutch comprises a cone clutch.

10. The system of claim 1, wherein the holding brake further includes a hub coupled to the motor shaft for rotation with the motor shaft about the rotational axis and supporting the first friction disc, the first member of the clutch configured for engagement with the hub for rotation with the hub about the rotational axis and axial movement relative to the hub along the rotational axis.

11. A system for controlling descent of a lift, comprising:

a linear actuator including an extension tube movable between a plurality of linear positions to raise and lower the lift;

an electric motor configured to cause movement of the extension tube of the linear actuator, the electric motor having a motor shaft coupled to the extension tube and configured for rotation about a rotational axis;

a holding brake configured to apply a braking torque to the motor shaft to prevent rotation of the motor shaft about the rotational axis and maintain a linear position of the extension tube of the linear actuator, the holding brake including a first friction disc coupled to the motor shaft for rotation therewith; and, a second friction disc fixed against rotation;

a variable torque control device having a rotatable member configured for rotation about the rotational axis; and, a stationary member disposed radially outward of the rotatable member, interaction between the rotatable member and the stationary member limiting a rotational speed of the rotatable member about the rotational axis;

a clutch movable between an engaged state and a disengaged state, the clutch having a first member configured for rotation with the motor shaft about the rotational axis and axial movement relative to the motor shaft along the rotational axis; and, a second member axially spaced from the first member when the clutch is in the disengaged state and coupled to the first member when the clutch is in the engaged state, the second member configured to support the rotatable member of the variable torque control device; and, means for engaging the clutch and releasing the holding brake.

12. The system of claim 11 wherein the means for engaging the clutch and releasing the holding brake causes engagement of the clutch before release of the holding brake.

13. The system of claim 11 wherein the means for engaging the clutch and releasing the holding brake includes:

a first lever coupled to the first member of the clutch;

a second lever coupled to the second friction disc of the holding brake; and, a lever actuator connecting the first and second levers and configured, upon movement of the lever actuator, to cause movement of the first lever to move the first member of the clutch towards the second member of the clutch and movement of the second lever to cause movement of the second friction disc of the holding brake away from the first friction disc of the holding brake.

14. The system of claim 13 wherein the lever actuator causes movement of the first lever before movement of the second lever.

15. The system of claim 13 wherein the lever actuator includes:

a shaft extending through the first and second levers;

a spring disposed about the shaft between an end of the shaft and a first side of the first lever; and, a ring supported on the shaft between the first and second levers and having a first side configured for engagement with a first side of the second lever.

16. The system of claim 15 wherein the first side of the ring is spaced from the first side of the second lever prior to movement of the lever actuator.

17. The system of claim 13 wherein the means for engaging the clutch and releasing the holding brake further includes a first cam assembly configured to translate movement of the first lever into movement of the first member of the clutch.

18. The system of claim 17 wherein the means for engaging the clutch and releasing the holding brake further includes a second cam assembly configured to translate movement of the second lever into movement of the second friction disc of the holding brake.

19. The system of claim 11 wherein the holding brake is a spring-set, electromagnetically-released brake and the electric motor and the holding brake receives power from a common power source.

20. The system of claim 11 wherein the clutch comprises a cone clutch.

* * * * *